United States Patent Office 3,549,355
Patented Dec. 22, 1970

3,549,355
QUATERNARY SOLDERING ALLOY
Willem Johannes Postma, Emmasingel, Eindhoven, Netherlands, assignor, by mesne assignments, to U.S. Philips Corporation, New York, N.Y., a corporation of Delaware
Filed Oct. 29, 1968, Ser. No. 771,590
Claims priority, application Netherlands, Nov. 1, 1967, 6714827
Int. Cl. C22c 33/00
U.S. Cl. 75—134         2 Claims

ABSTRACT OF THE DISCLOSURE

A soldering alloy, suitable for connecting together oxide ceramic magnetic components (e.g., manganese-zinc-ferrite and nickel-zinc-ferrite, has the composition: 41.10% by weight of tin, 58.11% by weight of bismuth, 0.75% by weight of antimony, and 0.04% by weight of arsenic.

---

Figure 1:
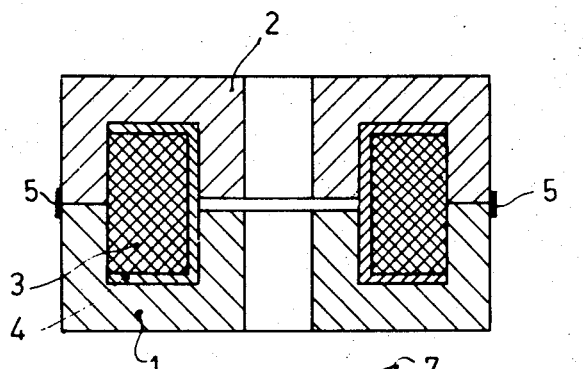

The invention relates to a soldering alloy which is suitable for connecting together oxide ceramic magnetic components. The invention also relates to the preparation of such an alloy.

In manufacturing electric components which comprise a soft-magnetic core of oxide ceramic magnetic material, it is sometimes necessary, with a view to the manufacture, that the core consists of two parts. This is necessary, for example, when the core of a coil is given such a shape that a part thereof encloses the coil in the form of a box. The coil is provided on a coil former. The assembly is placed in one half of the core after which the second half of the core is placed on the first half in such manner that the coil is enclosed entirely or partly by oxide ceramic magnetic material.

The difficulty in this and other methods in which oxide ceramic magnetic parts are secured together is to find a suitable material for connecting said parts. Actually, not only must a good adhesion of the components mutually be obtained which is resistant to shocks and vibrations and is not sensitive to moisture, but also the influence on the electric properties and the change of these properties with the temperature should be minimum. If any influence occurs, it should be constant and not become larger or smaller with varying temperature load with time. A varying influence of the electric properties occurs when the thickness of the connection seam with varying temperature load experiences a nonreproducible alteration. The latter may be the result of a combination of factors, the individual influence of which is hard to establish. It is assumed that at least a few of these factors are associated with the physical properties of the connection material, for example, the coefficient of thermal expansion and the tendency to creepage.

It is the object of the invention to provide a soldering metal which is suitable for joining components of oxide ceramic magnetic material.

According to the invention this can be achieved with a quaternary alloy of the following composition: 35 to 50% by weight of tin, 48–65% by weight of bismuth, 0.01 to 5% by weight of antimony, 0.01 to 5% by weight of arsenic.

It is known per se that the properties of binary bismuth-tin soldering alloys having a content of 54 to 60% by weight of bismuth can be improved by adding to these alloys antimony in a quantity of 0.7 to 0.09% by weight. By the addition of antimony a larger shearing strength and elasticity of soldered joints made with these alloys are obtained.

When using soldering alloys of this type, for example, of the composition 41.1% by weight of tin, 56.1% by weight of bismuth, 2.8% by weight of antimony for soldering oxide ceramic magnetic components together, it is found that some electrical properties of components manufactured therewith, for example, the inductance of coils wound on such cores, vary irreversibly with temperature.

The arsenic in the alloy composition according to the invention gives a significant improvement of the above properties. In addition the creepage of the soldering metal at higher temperatures is found to be decreased by the addition of arsenic.

Good soldered joints can be obtained with the alloy compositions according to the invention at temperatures of approximately 200° C. In order to obtain a good adhesion between oxide ceramic components, it is recommendable to provide the places to be soldered with a thin metal film, for example, a copper film. Such a film may be provided, for example, electroless.

In soldering together oxide ceramic soft-magnetic materials, for example, manganese-zinc-ferrite and nickel-zinc-ferrite, it has been found that particularly favourable results can be obtained with an alloy of the following composition:

41.10% by weight of tin,
58.11% by weight of bismuth,
0.75% of antimony, and
0.04% by weight of arsenic.

In order that the invention may be readily carried into effect, it will now be described in greater detail, by way of example, with reference to the accompany drawing, in which FIG. 1 is a cross-sectional view on an enlarged scale of a coil having a soft-magnetic core of manganese-zinc-ferrite.

Figure 2:
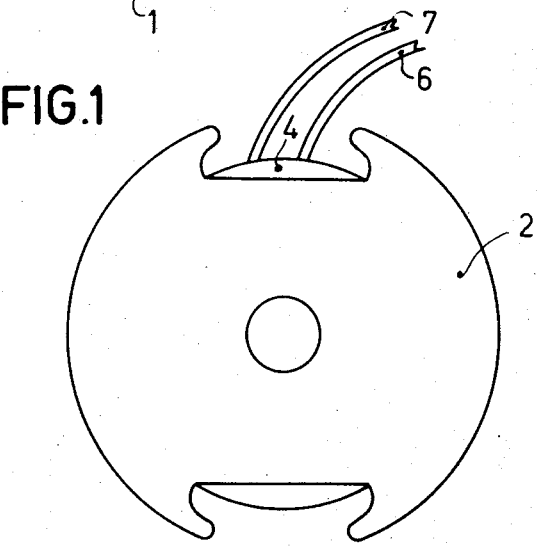

FIG. 2 is a plan view on the same scale of the same coil.

The coil of soft-magnetic material (manganese-zinc-ferrite) consists of two halves 1 and 2 which are joined together by a layer of solder 5. This layer is provided only on the outer surface of the halves 1 and 2, as a result of which the formation of stray air gaps in this construction is avoided. The core comprises a coil former 4 on which a coil 3 is wound, the coil is provided with two connection wires 6 and 7 (in practice several connection wires may be present). It has been found that, when using an antimony-containing tin-bismuth solder, the inductance of the coil varied irreversibly and inconstantly with a varying temperature load. When using a solder as described above which also contains arsenic the induction initially also varied irreversibly with varying temperature load, but after a few temperature cycles (−19° C. to +68.5° C.) the variations with temperature of the inductance became constant.

What I claim is:
1. A soldering alloy consisting essentially of 35 to 50% by weight of tin, 48 to 65% by weight of bismuth, 0.01 to 5% by weight of antimony and 0.01 to 5% by weight of arsenic.
2. The soldering alloy of claim 1 wherein about 41.10% by weight of tin is present, about 58.11% by weight of bismuth is present, about 0.75% by weight of antimony is present and about 0.04% by weight of arsenic is present.

References Cited
UNITED STATES PATENTS
3,079,455    2/1963    Haba _____ 75—134X L. DEWAYNE RUTLEDGE, Primary Examiner
E. L. WEISE, Assistant Examiner